United States Patent [19]
Uchiyama et al.

[11] Patent Number: 5,745,599
[45] Date of Patent: Apr. 28, 1998

[54] CHARACTER RECOGNITION METHOD

[75] Inventors: Tadasu Uchiyama, Yokosuka; Noboru Sonehara, Zushi; Akira Hiraiwa, Yokosuka, all of Japan

[73] Assignee: Nippon Telegraph and Telephone Corporation, Tokyo, Japan

[21] Appl. No.: 374,107

[22] Filed: Jan. 18, 1995

[30] Foreign Application Priority Data

Jan. 19, 1994 [JP] Japan .................................. 6-004204
Jun. 27, 1994 [JP] Japan .................................. 6-144654

[51] Int. Cl.$^6$ ...................................................... G06K 9/48
[52] U.S. Cl. ........................... 382/217; 382/187; 382/202
[58] Field of Search ................................. 382/187, 188, 382/189, 197, 198, 202, 209, 217

[56] References Cited

U.S. PATENT DOCUMENTS

| | | | |
|---|---|---|---|
| 4,653,107 | 3/1987 | Shojima et al. | 382/187 |
| 4,680,804 | 7/1987 | Kuzunuki et al. | 382/187 |
| 4,718,103 | 1/1988 | Shojima et al. | 382/187 |
| 4,845,768 | 7/1989 | Kochert et al. | 382/46 |
| 5,020,117 | 5/1991 | Ooi et al. | 382/46 |
| 5,038,382 | 8/1991 | Lipscomb | 382/13 |
| 5,101,439 | 3/1992 | Kiang | 382/9 |
| 5,315,667 | 5/1994 | Fujisaki et al. | 382/187 |

FOREIGN PATENT DOCUMENTS

| | | |
|---|---|---|
| 9311505 | 6/1993 | WIPO . |
| WO 93/11505 | 6/1993 | WIPO . |

OTHER PUBLICATIONS

"Stroke Order Free On–Line Handwritten Character Recognition Algorithm", K. Odaka et al., The Institute of Electronics and Communication Engineers of Japan, J65–D(6):679–686 (1982).

"Positional Stability of Stroke Representative Points of Online Handwritten Kanji Characters", Y. Ishii, The Institute of Electronics and Communication Engineers of Japan, J68–D(12):2107–2115 (1985).

"On–Line Recognition of Handprinted Characters: Survey and Beta Tests", F. Nouboud et al., Pattern recognition, 23(9):1031–1044 (1990).

The State of the art in on line handwriting recognition, Tappert et al., Aug 1990, IEEE Transactions on Pattern Analysis & Machine Intelligence vol. 12, No. 8, pp. 787–808.

*Primary Examiner*—Leo Boudreau
*Assistant Examiner*—Chris Kelley
*Attorney, Agent, or Firm*—Finnegan, Henderson, Farabow, Garrett & Dunner, L.L.P.

[57] ABSTRACT

The present invention provides a handwritten character recognition method in which neighboring points are connected by straight lines and the segments in-between points are then interpolated using broken lines. Each broken line is equally divided into k segments, and a number is assigned to each division point therein according to the time sequence of the respective point. A $(k+1)N \times N$ (N is the number of strokes) matrix P consisting of the elements of row $(k+1)(n-1)+1$ and column $k(m-1)+j$ comprising angle $\Omega$ formed by the straight line connecting division point i of stroke n and division point j of stroke m and the straight line connecting division point i of stroke n and division point j+1 of stroke m, is then calculated. The distance di between handwritten character Cx and matrix Qi (i=1–M) formed in the same manner from M templates corresponding to characters possessing the same number of strokes as character Cx, is calculated as the sum of the squares of each element of matrix P-Qi. The character Cz corresponding to the template Qz with the smallest distance dz is then selected as the recognition result.

19 Claims, 15 Drawing Sheets

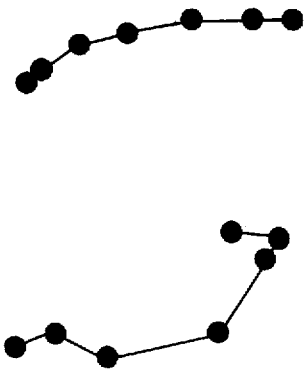
FIG.3A
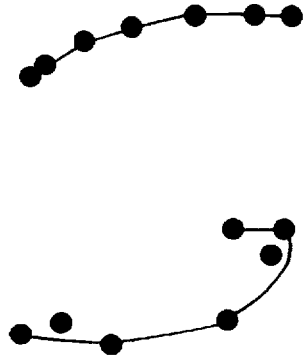
FIG.3C
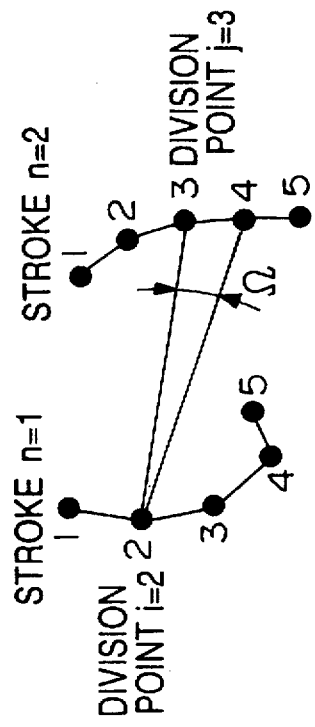
FIG.3B
FIG.3D
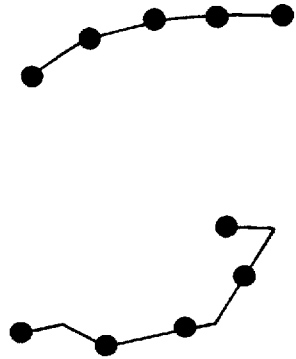

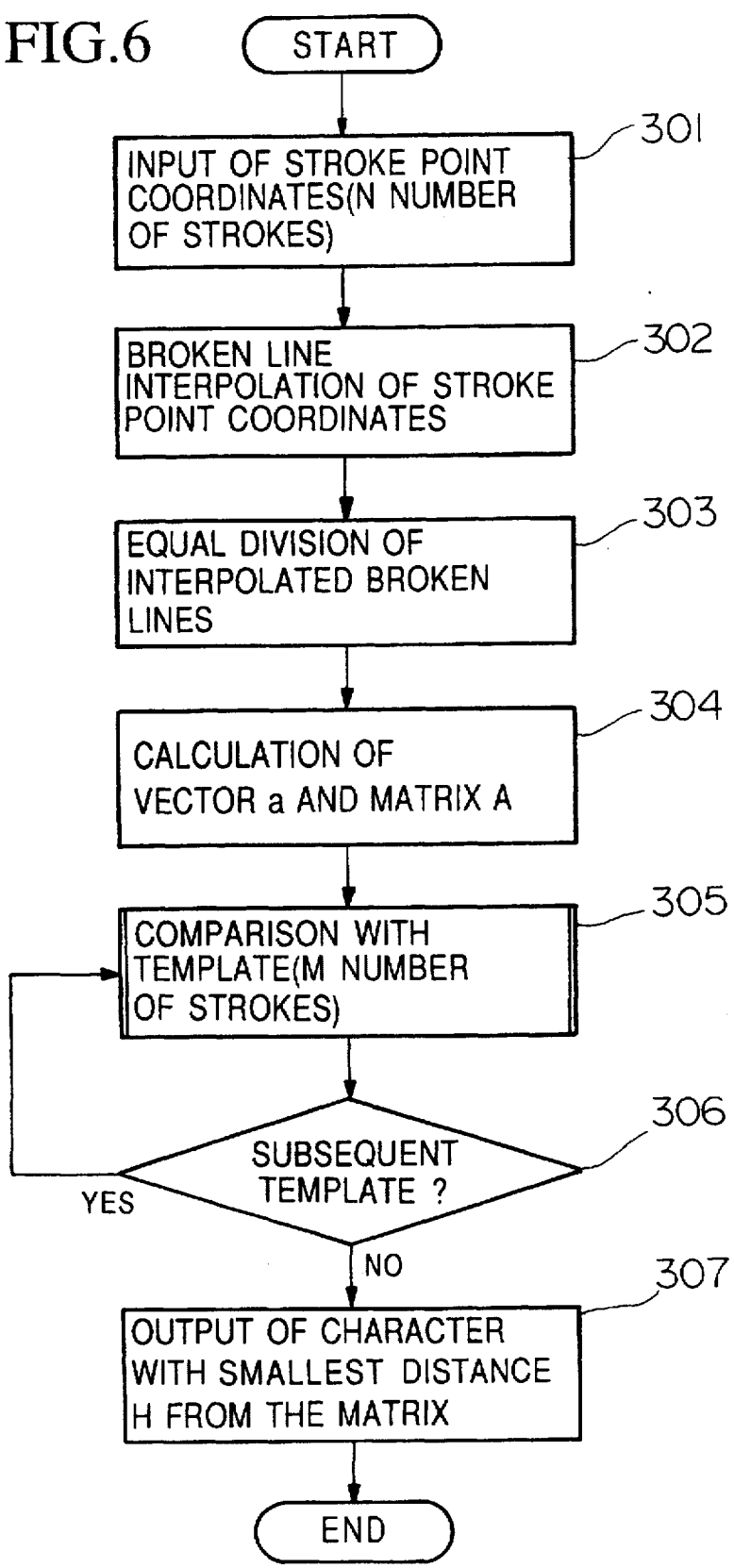

FIG.16
| STROKE ORDER WHEN THE CHARACTER IS WRITTEN IN PRINTED FORM | CONNECTION POSITIONS(DOTTED LINES)OBTAINED BY CONTINUOUSLY WRITING CONSECUTIVE STROKES WHEN THE CHARACTER IS WRITTEN IN RUNNING FORM | MINIMUM NUMBER OF STROKES WHEN THE CHARACTER IS WRITTEN IN THE AFOREMENTIONED PRINTED FORM |
|---|---|---|
| 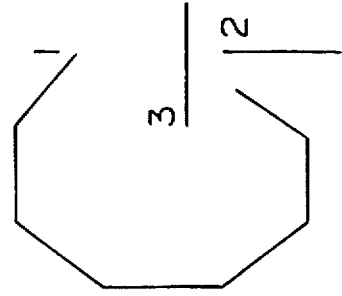 | 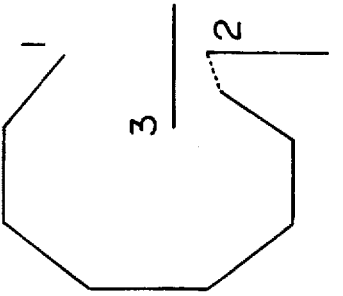 | 2 | form at least one stroke, said handwritten character recognition method comprising the steps of:

CHARACTER RECOGNITION METHOD

BACKGROUND OF THE INVENTION

1. Field of the Invention

The present invention relates to a character recognition method, in particular to an on-line handwritten character recognition method for recognizing characters written by hand.

2. Relevant Art

Conventionally on-line handwritten character recognition methods can be classified into pattern matching methods and structural analysis methods.

The pattern matching method conducts recognition based on the sum of distances between respective strokes wherein coordinates are assigned to each stroke comprising an input character and template (See Odaka, K. et al., "Stroke order free on-line handwritten character recognition algorithm"; The Journal of the Institute of Electronics, Information and Communication Engineered; Vol. J65-D, No. 6, pp. 679–686 (1982)). However, in this method, disadvantages exist in that, with regard to input characters that are largely distorted, the distance between the correct template is greater than the distance from another template, hence a large number of templates must be provided in order to account for various character distortions.

On the other hand, the structural analysis method conducts recognition based on the relative positional relationships between respective strokes comprising an input character and template (See Ishii,Yasuo; "Positional stability of stroke representative points of online handwritten kanji characters"; The Journal of the Institute of Electronics, Information and Communication Engineered; Vol. J68-D, No. 12, pp. 2107–2115 (1985)). This method also presents problems in that although certain (kanji) characters possess different character styles, these differing characters are more-or-less identified as the same character by means of the aforementioned relative positional relationships between strokes.

In addition, in both of the aforementioned methods, it is necessary to conduct some type of normalization processing in order to cope with the magnification, reduction and/or rotation of the handwritten characters. This processing greatly influences the success or failure of the character recognition.

SUMMARY OF THE INVENTION

Accordingly, it is an object of the present invention to provide a handwritten character recognition method which can process large distortions of handwritten characters using only one template, and recognize handwritten characters without being affected by the magnification, reduction and/ or rotation of the handwritten characters.

Therefore, the present invention provides a handwritten character recognition method for recognizing a handwritten input character by comparing said handwritten input character with a plurality of templates corresponding to a plurality of various types of characters based on time series information of points characterizing each stroke of said handwritten input character formed from at least one stroke, said handwritten character recognition method comprising the steps of:

expressing time series information of said points characterizing each stroke as points in a coordinate system;

forming a plurality of straight lines connecting points within said coordinate system corresponding to the points characterizing a stroke of said handwritten input character, and points within said coordinate system corresponding to the points characterizing another stroke of said handwritten input character, and expressing a shape for said handwritten input character by means of a matrix consisting of elements comprising a quantity calculated from a relative angle formed by means of said plurality of straight lines;

forming a plurality of straight lines connecting points within said coordinate system corresponding to the points characterizing a stroke of each of a plurality of templates, and points within said coordinate system corresponding to the points characterizing said stroke or another stroke, and expressing a shape for each of said templates by means of a matrix consisting of elements comprising a quantity calculated from a relative angle formed by means of said plurality of straight lines;

calculating a distance between said handwritten input character and each of said plurality of templates using said matrix expressing a shape for said handwritten input character, and said matrix expressing a shape for each template; and designating a character corresponding to a template selected based on said distance, as a recognition result of said handwritten input character.

According to the aforementioned handwritten character recognition method, a plurality of straight lines connecting the points characterizing a stroke of the handwritten character and other points are formed, and the shape of the handwritten character is then expressed by means of a matrix consisting of elements comprising a quantity calculated from a relative angle formed from these plurality of straight lines. In addition, in the same manner, a plurality of straight lines connecting the points characterizing a stroke of the template and other points are formed, and the shape of the template is then expressed by means of a matrix consisting of elements comprising a quantity calculated from a relative angle formed from these plurality of straight lines. The distance between the aforementioned handwritten character and template is then calculated using the above matrices of the handwritten character and template, and the character corresponding to the template of the smallest distance is selected as the recognition result of the aforementioned handwritten character.

In this manner, modifications of handwritten characters in which the stroke order and number of strokes are correct, can be handled using only one template. Therefore, it is possible to reduce both the recognition time, as well as the quantity of templates required for comparison with the handwritten inputted character, and also conduct recognition processing of these characters without being affected by magnification, reduction and/or rotation therein.

BRIEF DESCRIPTION OF THE DRAWINGS

FIG. 3(A) to FIG. 3(D) are diagrams showing points in displacement coordinate system, interpolation, trajectory division and matrix elements at the time of handwritten input of the Japanese symbol "い" according to a First Embodiment of the present invention.

FIG. 6 is a flowchart showing a recognition process of a handwritten character recognition method according to a Fourth Embodiment of the present invention.

FIG. 16 is a diagram showing second stroke order information of a template for a letter "G".

DETAILED DESCRIPTION OF THE INVENTION

In the following, the embodiments of the present invention will be explained with reference to the figures.
First Embodiment The First Embodiment of the present invention will be explained with reference to FIGS. 1, 2 and 3.

Figure 1:
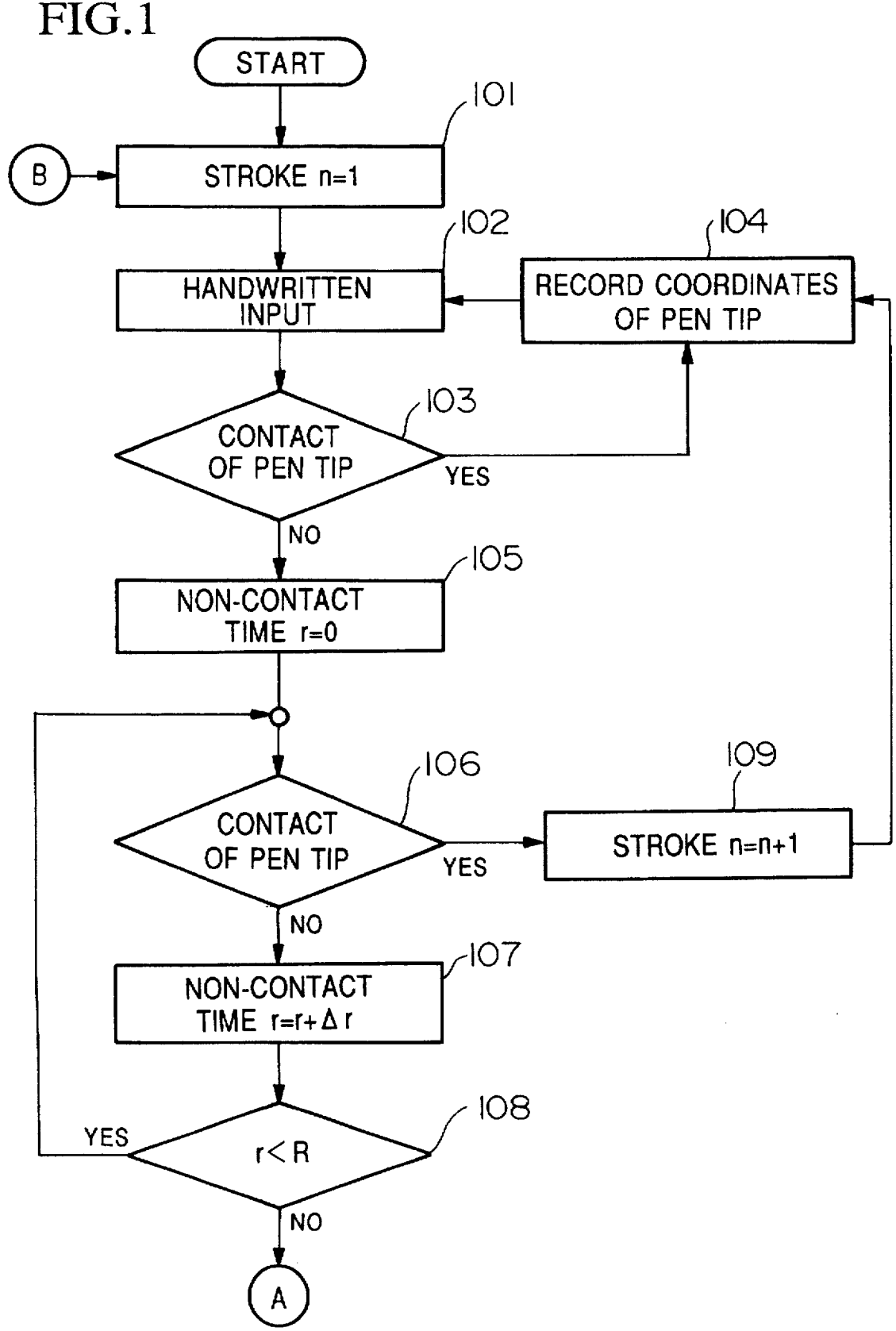
FIG. 1 is a flowchart showing an input process of a handwritten character recognition method according to a First Embodiment of the present invention.
Figure 2:
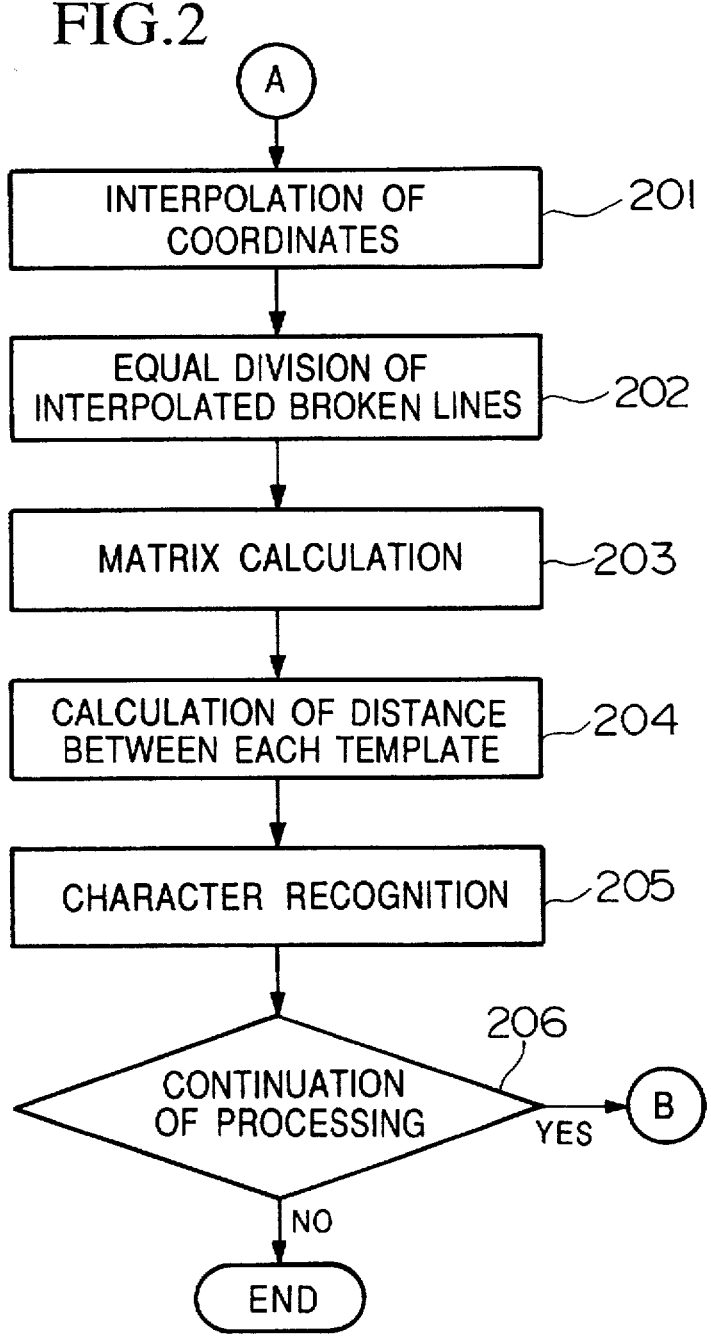
FIG. 2 is a flowchart showing a recognition process of a handwritten character recognition method according to a First Embodiment of the present invention.

FIG. 1 is a flowchart showing an input process of a handwritten character recognition method according to a First Embodiment of the present invention; FIG. 2 is a flowchart showing the recognition process of the aforementioned; and FIG. 3 is a diagram showing points which represent the horizontal and vertical components of the displacement of the pen tip moving along each stroke, interpolation, stroke division and matrix elements $\Omega$ at the time of handwritten input of the Japanese symbol "い".

The input process of the handwritten character recognition method according to present embodiment will now be explained based on FIG. 1.

The input process commences along with the assignment of stroke number n=1 (step 101), and handwritten input of the nth stroke of a character is conducted using a tablet digitizer or the like (step 102). This character is designated as Cx. The pen for use in handwritten input can detect whether or not the tip therein (pen tip) is in contact with the tablet digitizer (step 103). In the state where the pen tip is in contact with the tablet digitizer, the horizontal and vertical displacement of the pen tip are recorded as the time sequence information of the nth stroke (step 104). Measurement of the non-contact time r commences from the time point when the pen tip separates from the tablet digitizer (steps 105–107). This non-contact time r is then compared with a preset value R (step 108), and when the non-contact time r exceeds this preset value R, handwritten input of all strokes of the above character is completed, and the recognition process commences. In the case when the pen tip comes back into contact with the tablet digitizer while the non-contact time r does not exceed preset value R, handwritten input of the n+1 stroke commences, and input processing continues (steps 108, 106,109).

The recognition process of the handwritten character recognition method according to present embodiment will now be explained based on FIG. 2.

Initially, the neighboring points of each respective stroke recorded above are connected using straight lines and the intervals between stroke points therein are interpolated using broken lines (step 201). Subsequently, the broken lines resembling each stroke are equally divided into k ($k \geq 1$) broken lines, and numbers are assigned to each division point, i.e., 1, 2, ..., k+1 (1 is the stroke origin; k+1 is the end of the stroke) according to the time sequence of the points (step 202). A (k+1)N row×kN column (N is the number of strokes) matrix P consisting of elements is calculated, wherein the elements of row {(k+1)(n−1)+i} and column {k(m−1)+j} comprise an angle $\Omega$ formed by means of the straight line joining division point i of stroke n and division point j of stroke m, and the straight line joining division point i of stroke n and division point j+1 of stroke m (step 203).

The distance di (i=1, ..., M) between the inputted handwritten character Cx and M templates Qi (i=1, ..., M) corresponding to the respective characters possessing the same number of strokes is calculated as the sum of the squares of each element of matrix P-Qi (step 204). This sum of the square is calculated by means of taking either the sum of the squares of all elements of matrix P-Qi, or taking the sum of the squares of a specific portion of the above matrix (e.g., the portion of elements calculated from the straight line connecting a division point of stroke n and a division point of stroke n+1).

The character Cz corresponding to the template Qz with the smallest distance dz is then selected as the recognition result (step 205). If other characters for recognition exist, the procedure returns to step 101, and the above-described steps are repeated (step 206).

FIG. 3 is a diagram showing points which represent the horizontal and vertical components of the displacement of the pen tip moving along each stroke, interpolation, stroke division and matrix elements $\Omega$ at the time of handwritten input of the Japanese symbol "い" according to the aforementioned input and recognition processes. Each point shown in FIG. 3(A) indicates the horizontal and vertical displacement of the pen tip recorded in the input process of FIG. 1. Neighboring points are connected by straight lines, and broken line interpolation of the intervals between the recorded points therein is then conducted, as shown in FIG. 3(B). Subsequently, broken lines resembling each stroke are divided into four equivalent portions, and the numbers 1, 2, 3, 4, 5 are assigned to the respective division points according to the time sequence of the points forming each stroke, as shown in FIG. 3(C). In the present embodiment, N=2, k=4, n=1, and m=2, thus a 10×8 matrix P consisting of elements is calculated, wherein the element of the row i and column (4+j) comprises the angle $\Omega$ formed by means of the straight line joining division point i (i=1–5) of stroke n and division point j (j=1–4) of stroke m, and the straight line joining division point i of stroke n and division point j+1 of stroke m. The angle Ω shown in FIG. 3(D) comprises i=2, j=3, and thus indicates the element of row 2, column 7 of matrix P.

In this manner, the shape of a character is expressed by means of a matrix consisting of elements comprising a quantity calculated from a relative angle between respective strokes, thus the recognition process can be performed free of any influence from the size and/or direction of the handwritten inputted character.

Second Embodiment

In the following, the Second Embodiment of the present invention will be explained. Instead of the displacement coordinate system used in the First Embodiment, the Second Embodiment utilizes a velocity coordinate system where a coordinate represents horizontal and vertical components of the velocity of the pen tip moving along each stroke. Consequently, in step 104 of the input process shown in FIG. 1, recording of the horizontal and vertical components of the velocity of the pen tip serves as the only difference from the First Embodiment.

FIG. 4 is a diagram showing points representing the horizontal and vertical components of the velocity, interpolation, trajectory division and matrix elements Ω when the Japanese symbol "い" shown in FIG. 3 is handwritten as an input character.

Figure 4A:
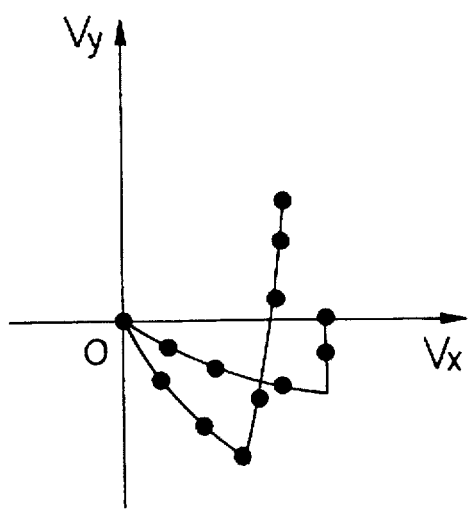
FIG. 4(A) to FIG. 4(D) are diagrams showing points in velocity coordinate system, interpolation, trajectory division and matrix elements at the time of handwritten input of the Japanese symbol "い" according to a Second Embodiment of the present invention.
Figure 4B:
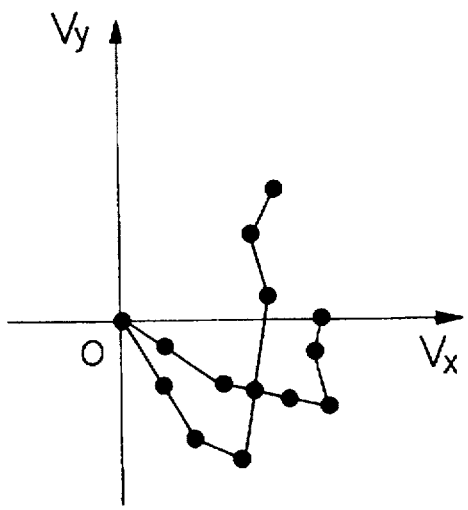
Figure 4C:
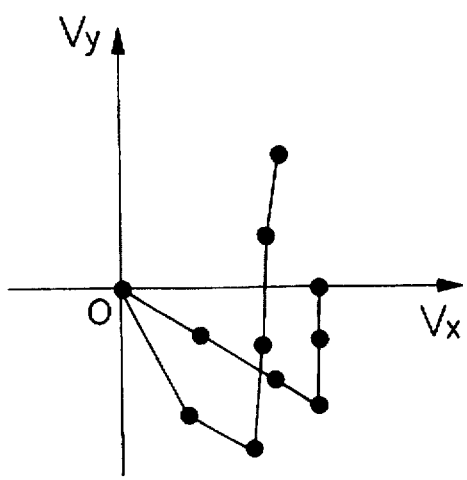
Figure 4D:
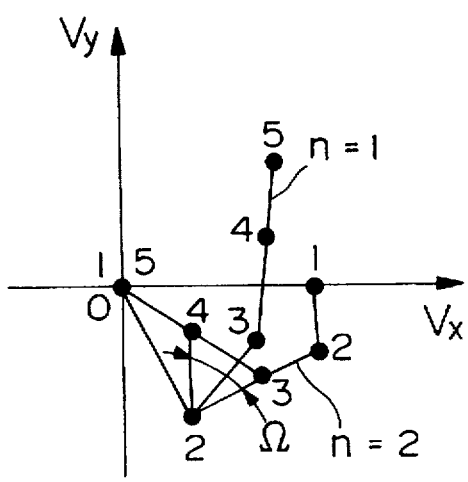
Figure 5A:
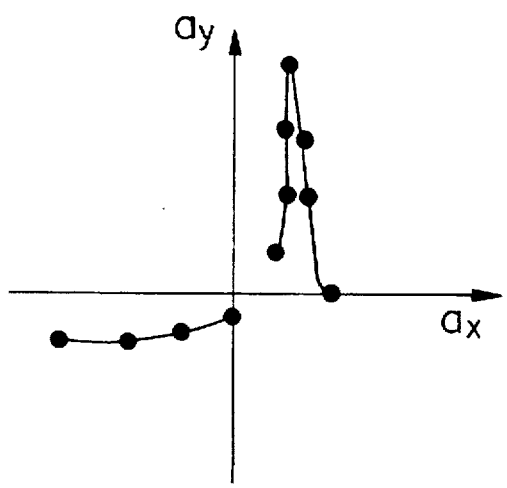
FIG. 5(A) to FIG. 5(D) are diagrams showing points in acceleration coordinate system, interpolation, trajectory division and matrix elements at the time of handwritten input of the Japanese symbol "い" according to a Third Embodiment of the present invention.
Figure 5B:
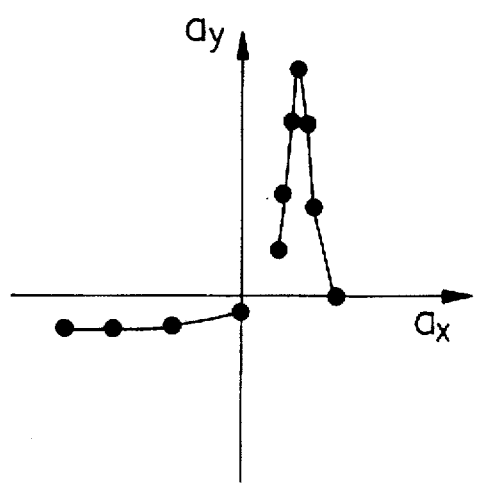
Figure 5C:
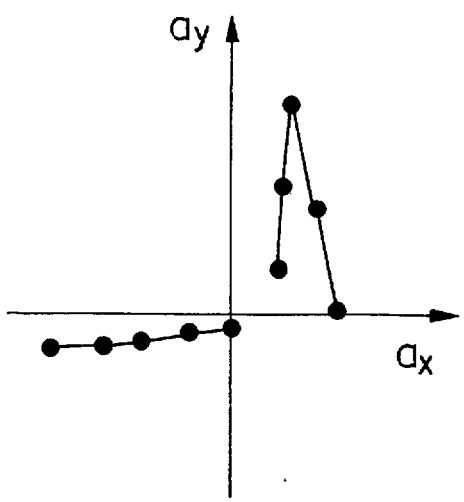
Figure 5D:
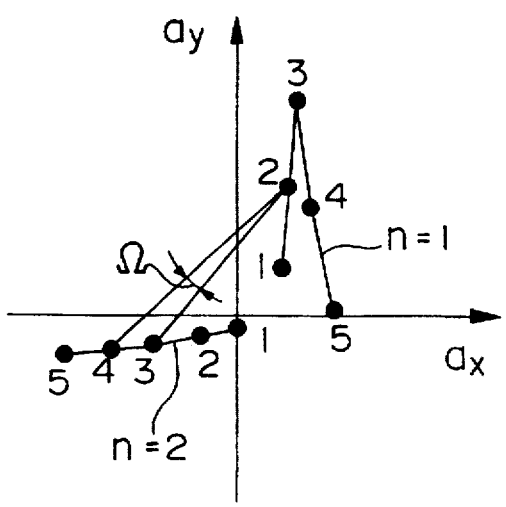

The points shown in FIG. 4(A) indicate the recorded points in the velocity coordinate system. The point at the origin of this velocity coordinate system corresponds to the point of the velocity coordinate system at the first stroke point. The curved line in which the last three values of the vertical coordinate are positive represents the trajectory of the left side stroke (n=1) of the Japanese symbol "い"; while the other curved line represents the trajectory of the right side stroke (n=2) of the Japanese symbol "い". FIGS. 4(B), (C) and (D) respectively correspond to FIGS. 3(B), (C) and (D), thus their explanations will be omitted.

Third Embodiment

In the following, the Third Embodiment of the present invention will be explained. Instead of the displacement coordinate system used in the First Embodiment, the Third Embodiment utilizes an acceleration coordinate system where a coordinate represents horizontal and vertical components of the acceleration of the pen tip moving along each stroke. Consequently, in step 104 of the input process shown in FIG. 1, recording of the horizontal and vertical components of the acceleration of the pen tip serves as the only difference from the First Embodiment.

FIG. 5 is a diagram showing points which represent the horizontal and vertical components of the acceleration, interpolation, trajectory division and matrix elements Ω when the Japanese symbol "い" shown in FIG. 3. is handwritten as an input character. The points shown in FIG. 5(A) indicate the recorded points in the acceleration coordinate system. The point closest to the origin of this acceleration coordinate system corresponds to the point of the acceleration coordinate system at the first stroke point. The curved line in which all values of the vertical coordinate are positive represents the trajectory of the left side stroke (n=1) of the Japanese symbol "い"; while the other curved line represents the trajectory of the right side stroke (n=2) of the Japanese symbol "い". FIGS. 5(B), (C) and (D) respectively correspond to FIGS. 3(B), (C) and (D), thus their explanations will be omitted.

Furthermore, methods for detecting velocity and acceleration of the pen tip include a method in which a sensor is provided in the pen (velocity sensor and acceleration sensor), and an arithmetic calculation method for the above. In addition, in FIGS. 3(C), 4(C) and 5(C) of the aforementioned First, Second and Third Embodiments, the broken lines resembling each trajectory are equally divided into four segments. However, the above embodiments are not limited to these examples, as long as the number of divisions and method of division correspond to a given template. In the same manner, angle Ω which comprises elements of matrix P is designated above as being formed by means of the straight line joining division point i (i=1, 2, . . . , k+1) of stroke n and division point j (j=1, 2, . . . , k) of stroke m, and the straight line joining division point i of stroke n and division point j+1 of stroke m. However, as long as this angle corresponds to a template, it is also possible for this angle to comprise the angle formed by means of the straight line joining division point i (i=1, 2, . . . , k+1) of stroke n and division point j (j=1,2, . . . , k) of stroke m, and the straight line joining division point i of stroke n and division point h of stroke m (h=1, 2, . . . , k; however h≠j).

Fourth Embodiment

In the following, the Fourth Embodiment of the present invention will be explained. FIGS. 6, 7, 8 and 9 are diagrams showing the procedural flow of the handwritten character recognition method according to the present embodiment.

The overall flow of the aforementioned will first be explained according to FIG. 7. Initially, the coordinates of the points forming each stroke of an input character of N strokes as measured by a tablet digitizer or the like is inputted (step 301). After interpolating the coordinates of the points forming each stroke by means of a broken line (step 302), this interpolated broken line is equally divided into k number of sections (step 303). Vector a and matrix A are then calculated using the coordinates of the division points (step 304).

An explanation of each process in the aforementioned steps 301–304 will now be explained using the example when the letter "G" is handwritten.

Figure 10A:
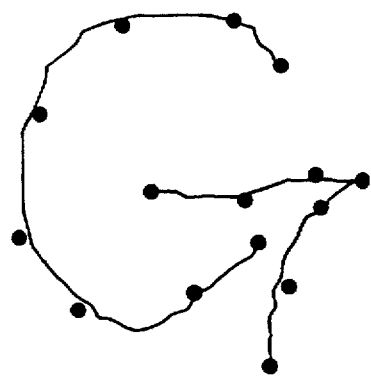
FIG. 10(A) to FIG. 10(C) are diagrams showing interpolation and stroke division of the letter "G".
Figure 10B:
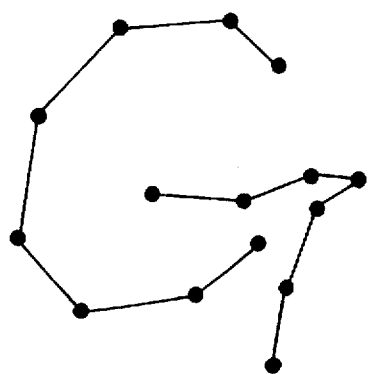
Figure 10C:
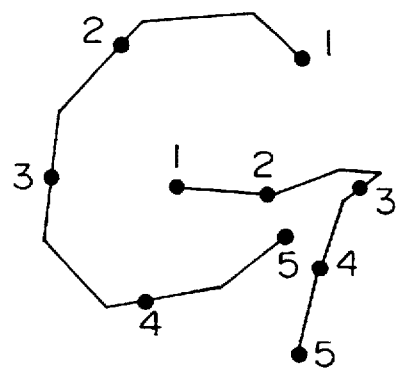

The points shown in FIG. 10(A) are the coordinates of the measured points forming the input character. As shown in FIG. 10(B), neighboring points are then connected by straight lines, and broken line interpolation is conducted. Subsequently, as shown in FIG. 10(C), the broken lines resembling each stroke are then equally divided into k (in FIG. 10(C), k=4) sections, and numbers are appropriately assigned to each division point (1 is the stroke origin; k+1 is the end of the stroke) according to the time sequence of the points (the aforementioned are steps 301–303).

Figure 11:
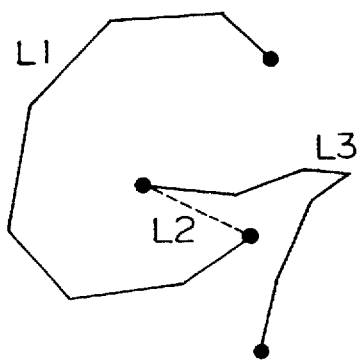
FIG. 11 is a diagram showing a calculation example of vector elements of a letter "G".
Figure 12A:
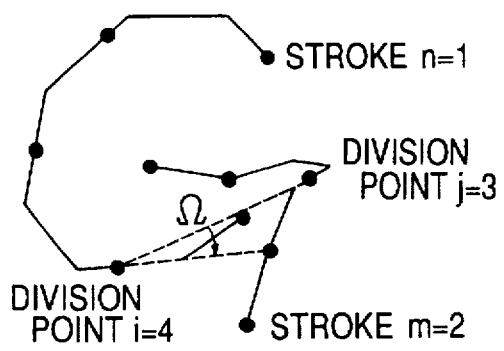
FIG. 12(A) to FIG. 12(D) are diagrams showing a calculation example of matrix elements of a letter "G".
Figure 12B:
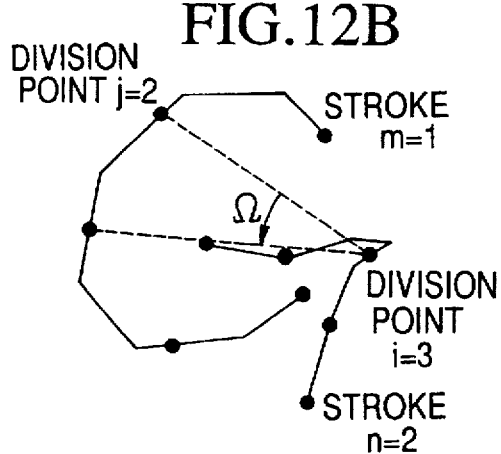
Figure 12C:
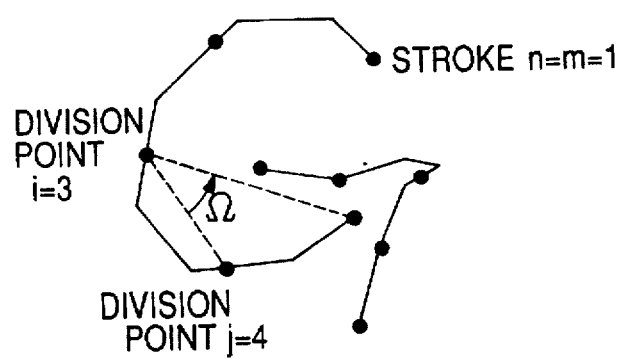
Figure 12D:
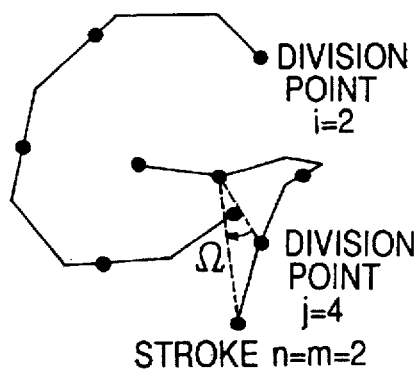

In step 304, vector a of the handwritten inputted letter "G", as shown in FIG. 11, is calculated as an (2N−1) dimensional vector comprising the elements of L1/(L1+L2+L3), L2/(L1+L2+L3) and L3/(L1+L2+L3), wherein L1 is the length of the first stroke (indicated by a solid line in FIG. 11), L2 is the distance between the end of the first stroke and the origin of the second stroke (indicated by a dotted line in FIG. 11), and L3 is the length of the second stroke (indicated by a solid line in FIG. 11): each of the aforementioned lengths is divided by L1+L2+L3 to produce the above elements.

Subsequently, matrix A which is obtained in step 304, is calculated as a (k+1)N row, kN column matrix consisting of the components of row (k+1)(n−1)+i and column k(m−1)+j comprising the angle Ω formed by means of a straight line joining the di division point i of stroke n and division point j of stroke m, as shown in FIG. 12.

For example, in the case of FIG. 12, the input letter "G" in which N=2, is interpolated and divided wherein k=4, thus matrix A is a 10×8 matrix. In the case when each element of matrix A is expressed by Axy (x=1, 2, ..., (k+1)N; y=1, 2, ..., kN), Ω shown in FIG. 12(A) consists of n=1, i=4, m=2 and j=3, thereby producing A47. In addition, in the same manner, Ω shown in FIG. 12(B) consists of n=2, i=3, m=1 and j=2, thereby producing A82; Ω shown in FIG. 12(C) consists of n=1, i=3, m=1 and j=4, thereby producing A34; and Ω shown in FIG. 12(D) consists of n=2, i=2, m=2 and j=4, thereby producing A78.

Figure 13:
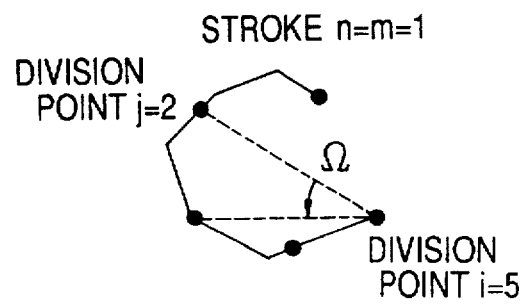
FIG. 13 is a diagram showing a calculation example of matrix elements of a letter "C".

The aforementioned matrix A is calculated in the exact same manner with regard to a character written with one stroke. For example, as shown in FIG. 13, when the letter "C" is entered, k=4 and N=1, thus matrix A is a 5×4 matrix. In addition, Ω shown in FIG. 13 consists of n=1, i=5, m=1 and j=2, thereby producing A52.

After the completion of the processes of the aforementioned steps 301–304, comparison with each template is performed (step 305) [the comparison of the input character with each template will be explained below]. The comparison is conducted until all templates have been compared. When all templates have been compared, the character corresponding to the template with the smallest distance H between the input character from the matrix is outputted as the recognition result (steps 306 and 307).

In the following, the flow of the comparison of the input character with each template in step 305 of FIG. 6 will be explained according to FIG. 7.

Figure 14:
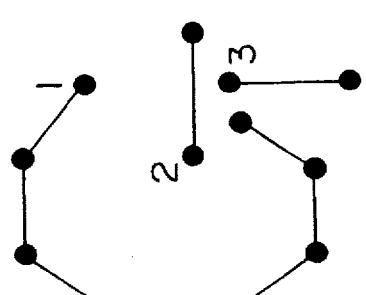
FIG. 14 is a diagram showing a template for a letter "G".
Figure 15:
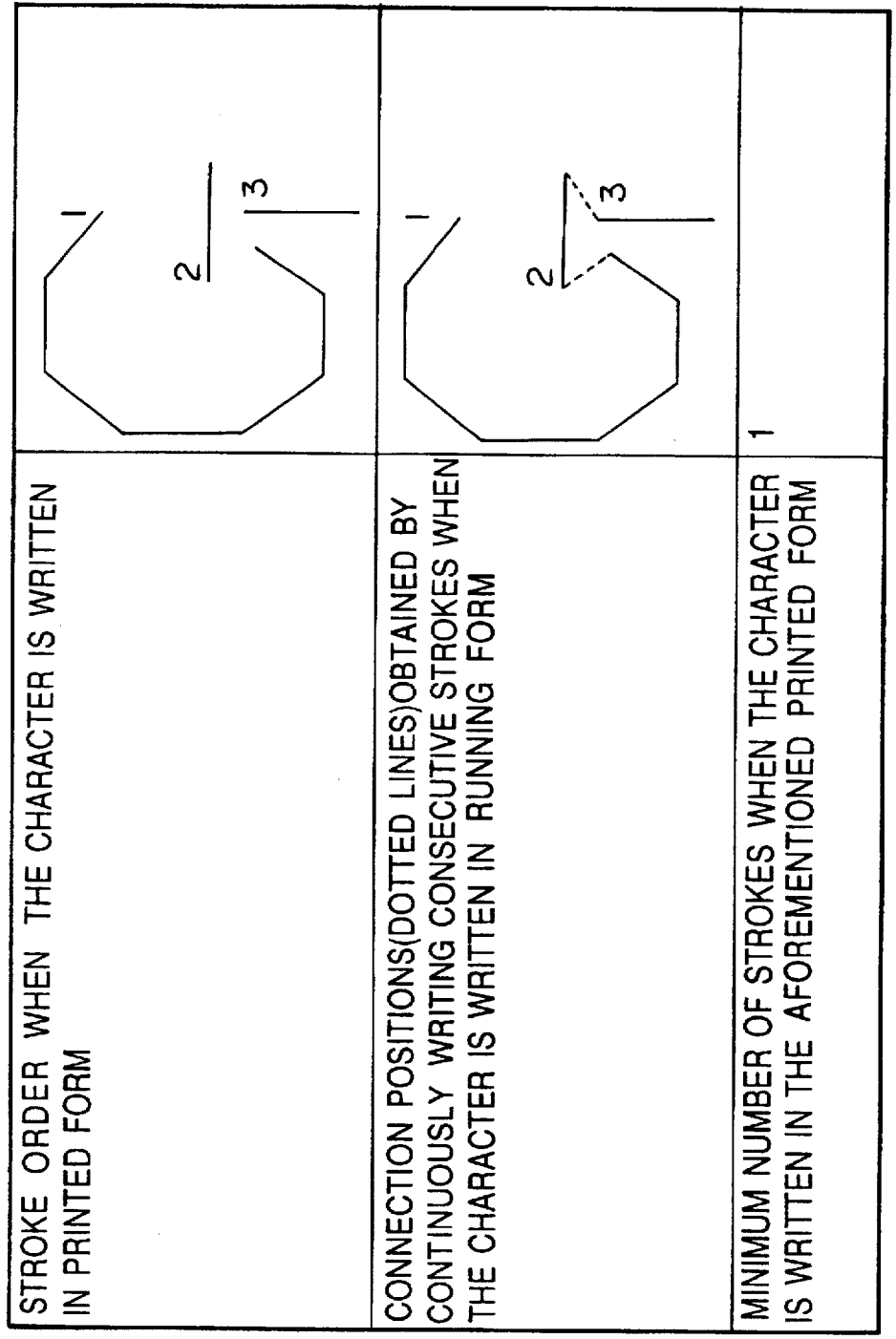
FIG. 15 is a diagram showing first stroke order information of a template for a letter "G".

However, before proceeding to this explanation, an example of a template shown in FIG. 14 will first be described. With regard to the template "G" shown in the aforementioned figure, the coordinates of the points forming each stroke are registered as a three-stroke character possessing the stroke order information shown in FIGS. 15 and 16. The first stroke order information (FIG. 15) comprises the stroke order of 1, 2, 3 in which the letter "G" is written. In this case, it is possible to continuously write the strokes coming before and after the intervals between strokes 1 and 2, and strokes 2 and 3, thus the minimal number of strokes is designated as "1". The second stroke order information (FIG. 16) comprises the stroke order of 1, 3, 2 in which the letter "G" is written. It is possible to continuously write the strokes coming before and after the interval between strokes 1 and 2, thus the minimal number of strokes, in this case, is designated as "2".

Figure 7:
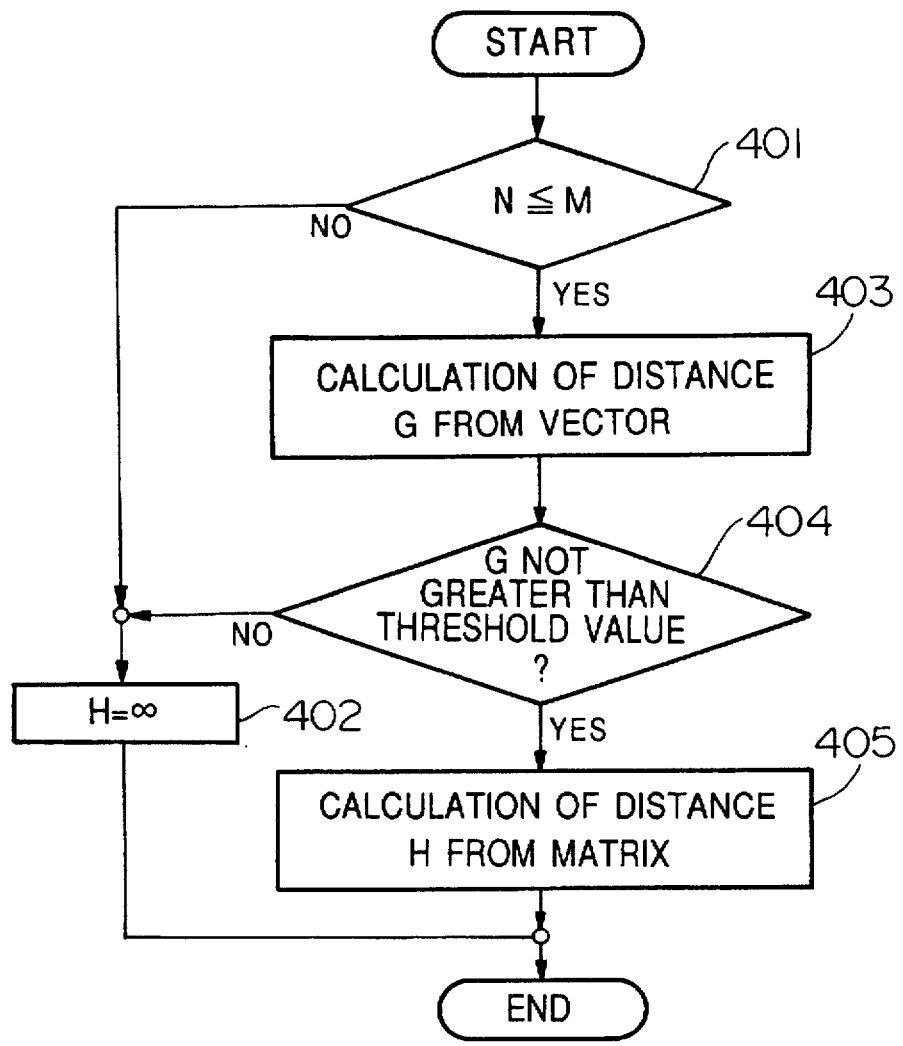
FIG. 7 is a flowchart showing a comparison procedure of the handwritten input character with each template.

In the flowchart of FIG. 7, the number of strokes when the characters of the templates to be compared are written in square (printed) style is M. After comparing N and M (step 401), in the case when N≦M is not satisfied, the distance H from the matrix of this template and the input character results in H=∞ (step 402). In the case when N≦M is satisfied, the distance G from the vector of this template and the input character is calculated (step 403) [the method for calculating distance G will be explained in detailed below].

Subsequently, this distance G is compared with a preset threshold value (step 404), and in the case when distance G exceeds this preset threshold value, the distance H from the matrix of the aforementioned template and the input character results in H=∞ (step 402). In the case when the aforementioned distance does not exceed the preset threshold value, the distance between matrix A', formed from the above template, and matrix A is calculated (step 405), and this calculated distance is designated as distance H from the matrix of the above template and the input character [the method for calculating distance H will be explained in detailed below]. The procedure moves to step 306 of FIG. 6 after obtaining distance H.

Figure 8:
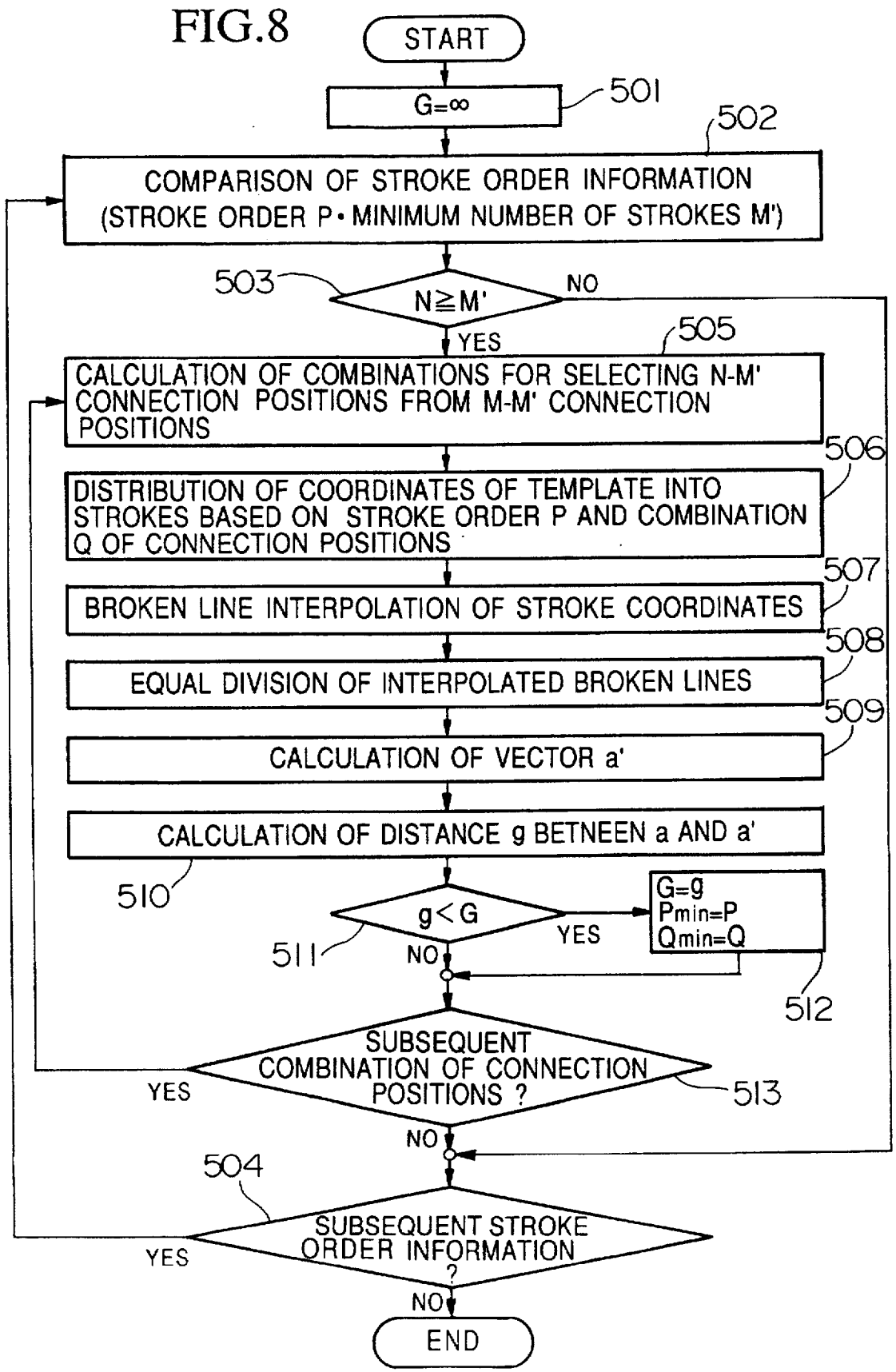
FIG. 8 is a flowchart showing a procedure for calculating distance by means of vectors.

In the following, the flow of the calculation of distance G from the vector of each template and the input character in step 403 of FIG. 7 will be explained according to FIG. 8.

The initial value of distance G from a vector is set to G=∞ (step 501). Each template possesses at least one of the aforementioned stroke order information, and a comparison between the stroke order of the inputted character and the stroke order of a template is performed for each stroke order information. In addition, the minimum number of strokes of the stroke order information to be compared is designated as M', and compared with the number of strokes N of the inputted character (step 502). The result of this comparison is determined (step 503), and in the case when N≧M' is not satisfied, the comparison with the subsequent stroke order is performed (step 504). In the case when N≧M' is satisfied, all possible combinations Q for selecting N–M' connection positions from M–M' connection positions are calculated (step 505), and the stroke point coordinates of the template are distributed into N number of strokes based on the stroke order to be compared and connection position Q (step 506).

Vector a' of the template is then calculated in response to the N strokes formed above according to the same method as in the calculation of vector a in step 304 of FIG. 6. In other words, the coordinates of the points forming each stroke of the template are subjected to broken line interpolation (step 507), the interpolated broken line is equally divided (step 508), and vector a' is calculated (step 509). The absolute values of the differences between the components of vector a and vector a' are then summed to produce distance g (step 510). g and G are then compared (step 511), and when g>G, a decision is made as to whether or not a subsequent combination of connection points exists (step 513). In addition, in the case when g<G, G=g is designated, and the stroke order P and combination of connection positions Q are recorded as Pmin and Qmin, respectively (step 512). Following this, a decision is made as to whether or not a subsequent combination of connection points exists (step 513). In the case when a subsequent combination of connection points exists, the process returns to step 505 and the aforementioned procedure is repeated. In the case when a subsequent combination of connection points does not exist, the process moves to step 504 where a comparison with the subsequent stroke order information is performed. When the subsequent stroke order information has been compared, the process moves to step 404 of FIG. 7.

Figure 9:
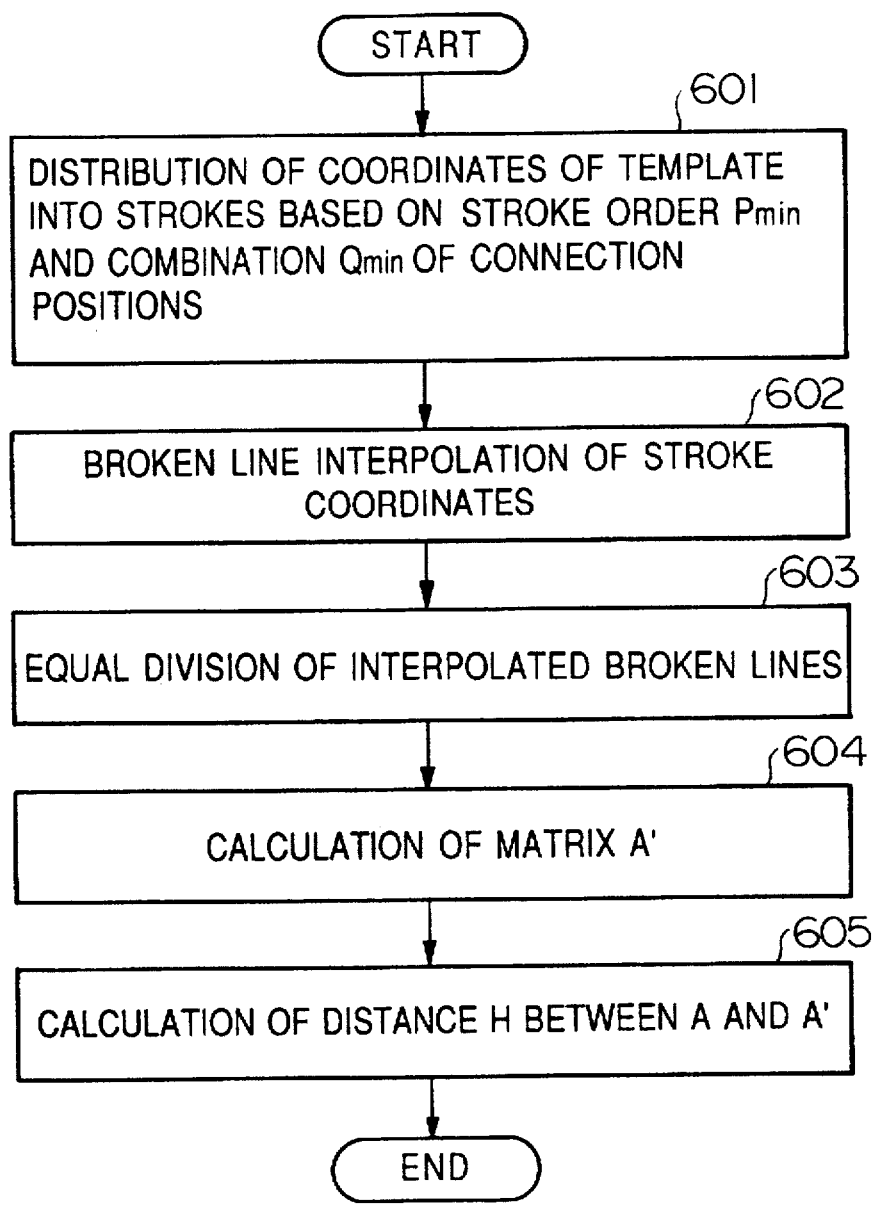
FIG. 9 is a flowchart showing a procedure for calculating distance by means of matrices.

In the following, the flow of the calculation of distance H from the matrix of each template and the input character in step 405 of FIG. 7 will be explained according to FIG. 9.

Initially, the points forming each stroke of the template is distributed into N strokes based on stroke order Pmin and combination of connection positions Qmin (step 601). Matrix A' is the n calculated (step 602–604) with respect to the N strokes formed above in the same manner as in the calculation of matrix A in step 304 of FIG. 6. Calculation of 1-cos(Ω–Ω') for the difference Ω–Ω' between each respective component of matrix A and A' are performed, and the overall sum of this calculation with regard to all components is designated as distance H from the matrix (step 605). After distance His obtained according to the aforementioned, the process proceeds to step 306 of FIG. 6.

Figure 17:
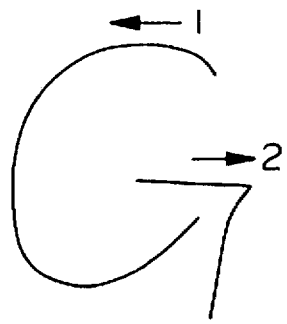
FIG. 17 is a diagram showing handwritten input of a letter "G" in a handwritten character recognition method according to a Fourth Embodiment of the present invention.

The procedure of template comparison shown in FIG. 6 will now be concretely explained using, as an example, the case when handwritten input of the letter "G" is performed using two strokes (N=2) as shown in FIG. 17.

Figure 18A:
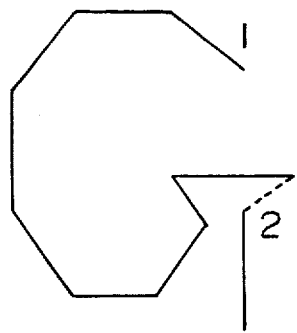
FIG. 18(A) to FIG. 18(C) are diagrams showing a combination of a stroke order and connection positions when a letter "G" is written by means of two strokes.
Figure 18B:
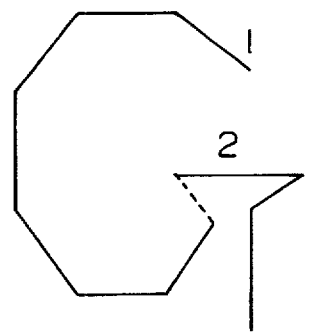
Figure 18C:
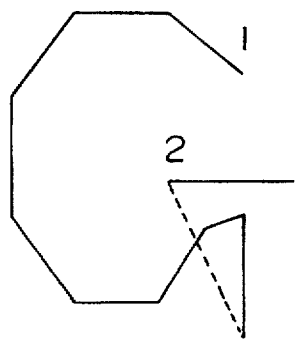

The three examples of the stroke order and combination of connection positions when writing the letter "G" using two strokes are shown in FIGS. 18(A)–(C). In FIGS. 18(A)–(C), strokes each of which is handwritten in a single stroke are expressed by a solid line. Vector a' and the distance G from this vector are calculated with respect to each example of FIGS. 18(A)–(C). These results show that the stroke order and combination of connection positions of FIG. 18(B) provide for the smallest distance. The points forming each stroke of the template is then distributed into two strokes based on the aforementioned stroke order and combination of connection positions. In other words, the points of the first stroke of the template are distributed into the first stroke, and the points of the second and the third strokes are distributed into the second stroke. A matrix and distance H from this matrix are then calculated according to the aforementioned method with respect to the two strokes formed above.

As described above, at least one stroke order information is contained in one template. Consequently, even characters written in running style can be processed using only one template, and thus it is possible to reduce the recognition time, as well as the quantity of templates required for comparison with the inputted character.

What is claimed is:

1. A method for recognizing a handwritten input character by comparing said handwritten input character with a plurality of templates corresponding to a plurality of various types of characters based on time series information of points characterizing each stroke of said handwritten input character formed from at least one stroke, said handwritten character recognition method comprising the steps of:

expressing time series information of said points characterizing each stroke as coordinate points in a coordinate system;

calculating, with regard to a plurality of coordinate points within said coordinate system corresponding to a plurality of points characterizing a stroke of said handwritten input character, the relative angles formed by two straight lines formed by means of connecting a coordinate point, used as a reference, characterizing one stroke to two neighboring coordinate points from either a plurality of other coordinate points characterizing the same stroke as this reference coordinate point or a plurality of coordinate points characterizing another stroke, with regard to two neighboring coordinates of all of either of a plurality of other coordinate points characterizing the same said stroke or a plurality of coordinate points characterizing another stroke;

respectively calculating an angle the same as said relative angle using each coordinate point as a reference, with regard to all other coordinate points characterizing the same said stroke as said reference coordinate point of said handwritten input character or all of a plurality of coordinate points characterizing another stroke;

expressing a shape of said handwritten input character by means of a matrix consisting of elements comprising a quantity relating to each of said relative angles calculated with regard to said handwritten input character;

calculating, with regard to a plurality of coordinate points within said coordinate system corresponding to a plurality of points characterizing a stroke of each template, the relative angles formed by two straight lines formed by means of connecting a coordinate point, used as a reference, characterizing one stroke to each of two neighboring coordinate points of either other coordinate points characterizing the same stroke as this reference coordinate point or a plurality of coordinate points characterizing another stroke, with regard to all pairs of neighboring coordinate points of either a plurality of other coordinate points characterizing the same said stroke or a plurality of coordinate points characterizing another stroke;

respectively calculating an angle the same as said relative angle using each coordinate point as a reference with regard to all other coordinate points characterizing the same said stroke as said reference coordinate point of said template or all of a plurality of coordinate points characterizing another stroke;

expressing a shape of each of said templates by means of a matrix consisting of elements comprising a quantity relating to each of said relative angles calculated with regard to said template;

calculating a distance between said handwritten input character and each of said plurality of templates using said matrix expressing a shape for said handwritten input character, and said matrix expressing a shape for each template; and designating a character corresponding to a template selected based on said distance as a recognition result of said handwritten input character.

2. A method according to claim 1 wherein said time series information of points is a horizontal direction component and a vertical direction component of a velocity vector of a moving pen tip occurring at each time during a pen movement during handwritten input, and said coordinate system regards said horizontal direction component and said vertical direction component of said velocity vector of said moving pen tip as coordinate values of a horizontal axis and a vertical axis, respectively.

3. A method for recognizing a handwritten input character by comparing said handwritten input character with a plurality of templates corresponding to a plurality of various types of characters based on time series information of points characterizing each stroke of said handwritten input character formed from at least one stroke, said handwritten character recognition method comprising the steps of:

expressing time series information of a pen movement, which is a horizontal direction component and a vertical direction component of an acceleration vector of said pen movement occurring at each time during pen movement when inputting a handwritten character, as coordinate points in an acceleration coordinate system in which the coordinate values of a horizontal axis and a vertical axis are a horizontal direction component and a vertical direction component of a pen movement acceleration vector;

calculating, with regard to a plurality of coordinate points within said coordinate system corresponding to a plurality of points characterizing a stroke of said handwritten input character, the relative angles formed by two straight lines formed by means of connecting a coordinate point, used as a reference, characterizing one stroke to two neighboring coordinate points from either a plurality of other coordinate points characterizing the same stroke as this reference coordinate point or a plurality of coordinate points characterizing another stroke, with regard to two neighboring coordinates of all of either of a plurality of other coordinate points characterizing the same said stroke or a plurality of coordinate points characterizing another stroke;

respectively calculating an angle the same as said relative angle using each coordinate point as a reference, with regard to all other coordinate points characterizing the same said stroke as said reference coordinate point of said handwritten input character or all of a plurality of coordinate points characterizing another stroke;

expressing a shape of said handwritten input character by means of a matrix consisting of elements comprising a quantity relating to each of said relative angles calculated with regard to said handwritten input character;

calculating, with regard to a plurality of coordinate points within said coordinate system corresponding to a plurality of points characterizing a stroke of each template, the relative angles formed by two straight lines formed by means of connecting a coordinate point, used as a reference, characterizing one stroke to each of two neighboring coordinate points of either other coordinate points characterizing the same stroke as this reference coordinate point or a plurality of coordinate points characterizing another stroke, with regard to all pairs of neighboring coordinate points of either a plurality of other coordinate points characterizing the same said stroke or a plurality of coordinate points characterizing another stroke;

respectively calculating an angle the same as said relative angle using each coordinate point as a reference with regard to all other coordinate points characterizing the same said stroke as said reference coordinate point of said template or all of a plurality of coordinate points characterizing another stroke;

expressing a shape of each of said templates by means of a matrix consisting of elements comprising a quantity relating to each of said relative angles calculated with regard to said template;

calculating a distance between said handwritten input character and each of said plurality of templates using said matrix expressing a shape for said handwritten input character, and said matrix expressing a shape for each template; and designating a character corresponding to a template selected based on said distance as a recognition result of said handwritten input character.

4. A method according to claim 1, wherein said time series information of points characterizing each stroke represents displacement of the pen tip moving along each stroke; and said coordinate system is a displacement coordinate system.

5. A method according to claim 4, wherein at least one stroke order when said character is written in printed form; connection position where a stroke and its preceding stroke are continuously written when said character is written in running style using each stroke order; and stroke order information of a character formed from a minimum number of strokes when said character is written in running style using each stroke order, are included as structural elements of said template.

6. A method according to claim 4, wherein intervals between neighboring points in said displacement coordinate system are connected by straight lines, and interpolated by means of broken line interpolation; said broken lines resembling each stroke are divided into k broken lines (k≧1) based on predetermined conditions; and an angle formed by means of a straight line connecting division point An, I (I=1, 2, . . . , k+1) of an nth stroke and division point Am, j (j=1, 2, . . . , k) of an mth stroke, and a straight line connecting said division point An, I and division point Am, h (h=1, 2, . . . , k; wherein h≠d) is designated as said relative angle.

7. A method according to claim 6, wherein intervals between neighboring points in said displacement coordinate system are connected by straight lines, and interpolated by means of broken line interpolation; said broken lines resembling each stroke are equally divided into k broken lines (k≧1); and an angle formed by means of a straight line connecting division point An, I (I=1, 2, . . . , k+1) of an nth stroke and division point Am, j (j=1, 2, . . . , k) of an mth stroke, and a straight line connecting said division point An, I and division point Am, j+1 (j=1, 2, . . . , k) is designated as said relative angle.

8. A method according to claim 7, wherein a character, number of strokes of said character when written in printed form, and coordinates of points in said displacement coordinate system of each stroke of said character when written in printed form are registered as structural elements of a template of said character.

9. A method according to claim 8, further comprising the steps of:

expressing the relationship of stroke length forming said handwritten input character by means of a vector comprising distance between an end point of a stroke and starting point of a stroke subsequent to said stroke, and length of each stroke, as essential components;

expressing the relationship of stroke length forming said template by means of a vector comprising distance between an end point of a stroke and starting point of a stroke subsequent to said stroke of a character formed by continuously writing neighboring strokes at several connection positions using each stroke order contained in said template, in a manner such that a character of said template and said handwritten input character possess the same number of strokes, and length of each stroke of said formed character, as essential components;

calculating a distance between said vectors for each stroke order and combination of connection positions;

distributing points in said displacement coordinate system of said template according to said stroke order and connection points providing for a minimum distance; and calculating said relative angle.

10. A method according to claim 2, wherein all points in said velocity coordinate system are connected by straight lines, and interpolated by means of broken line interpolation; said broken lines resembling each stroke are divided into k broken lines (k≧1) based on predetermined conditions; and an angle formed by means of a straight line connecting division point An, I (I=1, 2, . . . , k+1) of an nth stroke and division point Am, j (j=1, 2, . . . , k) of an mth stroke, and a straight line connecting said division point An, I and division point Am, h (h=1, 2, . . . , k; wherein h≠j) is designated as said relative angle.

11. A method according to claim 10 wherein all points in said velocity coordinate system are connected by straight lines, and interpolated by means of broken line interpolation; said broken lines resembling each stroke are equally divided into k broken lines (k≧1); and an angle formed by means of a straight line connecting division point An, I (I=1, 2, . . . , k+1) of an nth stroke and division point Am, j (j=1, 2, . . . , k) of an mth stroke, and a straight line connecting said division point An, I and division point Am, j+1 (j=1, 2, . . . , k) is designated as said relative angle.

12. A method according to claim 11, wherein a character, number of strokes of said character when written in printed form, and coordinates of points in said velocity coordinate system of each stroke of said character when written in printed form are registered as structural elements of a template of said character.

13. A method according to claim 11, wherein at least one of the following is included as structural elements of said template:

stroke order when said character is written in printed form; connection position where a stroke and its preceding stroke are continuously written when said character is written in running style using each stroke order; and stroke order information of a character formed from a minimum number of strokes when said character is written in running style using each stroke order.

14. A method according to claim 11, further comprising the steps of:

expressing the relationship of stroke length forming said handwritten input character by means of a vector comprising distance between an end point of a stroke and a starting point of a stroke subsequent to said stroke, and length of each stroke, as essential components;

expressing the relationship of stroke length forming said template by means of a vector comprising distance between an end point of a stroke and a starting point of a stroke subsequent to said stroke of a character formed by continuously writing neighboring strokes at several connection positions using each stroke order contained in said template, in a manner such that a character of said template and said handwritten input character possess the same number of strokes, and length of each stroke of said formed character, as essential components;

calculating a distance between said vectors for each stroke order and combination of connection positions;

distributing points of said velocity coordinate system of said template according to said stroke order and connection points providing for a minimum distance; and calculating said relative angle.

15. A method according to claim 3, wherein all points in said acceleration coordinate system are connected by straight lines, and interpolated by means of broken line interpolation; said broken lines resembling each stroke are divided into k broken lines ($k \geq 1$) based on predetermined conditions; and an angle formed by means of a straight line connecting division point An, I ($I=1, 2, \ldots, k+1$) of an nth stroke and division point Am, j ($j=1, 2, \ldots, k$) to an mth stroke, and a straight line connecting said division point An, I and division point Am, h ($h=1, 2, \ldots k$; wherein $h \neq j$) is designated as said relative angle.

16. A method according to claim 15, wherein all points in said acceleration coordinate system are connected by straight lines, and interpolated by means of broken line interpolation; said broken lines resembling each stroke are equally divided into k broken lines ($k \geq 1$); and an angle formed by means of a straight line connecting division point An, I ($I=1, 2, \ldots, k+1$) of an nth stroke and division point Am, j ($j=1, 2, \ldots, k$) of an mth stroke, and a straight line connecting said division point An, I and division point Am, j+1 ($j=1, 2, \ldots, k$) is designated as said relative angle.

17. A method according to claim 16, wherein a character, number of strokes of said character when written in printed form, and coordinates of points in said acceleration coordinate system of each stroke of said character when written in printed form are registered as structural elements of a template of said character.

18. A method according to claim 16, wherein at least one of the following are included as structural elements in said template:

stroke order when said character is written in printed form; connection position where a stroke and its preceding stroke are continuously written when said character is written in running style using each stroke order; and stroke order information of a character formed from a minimum number of strokes when said character is written in running style using each stroke order.

19. A method according to claim 18, further comprising the steps of:

expressing the relationship of stroke length forming said handwritten input character by means of a vector comprising distance between an end point of a stroke and starting point of a stroke subsequent to said stroke, and length of each stroke, as essential components;

expressing the relationship of stroke length forming said template by means of a vector comprising distance between an end point of a stroke and a starting point of a stroke subsequent to said stroke of a character formed by continuously writing neighboring strokes at several connection positions using each stroke order contained in said template, in a manner such that a character of said template and said handwritten input character possess the same number of strokes, and length of each stroke of said formed character, as essential components;

calculating a distance between said vectors for each stroke order and combination of connection positions;

distributing points of said acceleration coordinate system of said template according to said stroke order and connection points providing for a minimum distance; and calculating said relative angle.

* * * * *

UNITED STATES PATENT AND TRADEMARK OFFICE
CERTIFICATE OF CORRECTION

PATENT NO. : 5,745,599
DATED : April 28, 1998
INVENTOR(S) : Tadasu UCHIYAMA et al.

It is certified that error appears in the above-identified patent and that said Letters Patent is hereby corrected as shown below:

Claim 6, column 11, line 59, "h≠d" should read --h≠j--.

Signed and Sealed this

Twenty-second Day of December, 1998

Attest:

BRUCE LEHMAN

*Attesting Officer*  *Commissioner of Patents and Trademarks*